(12) United States Patent
Mackay (10) Patent No.: US 7,716,660 B2
(45) Date of Patent: May 11, 2010

(54) METHOD AND SYSTEM FOR DOWNLOADING UPDATES

(75) Inventor: Jason F Mackay, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 988 days.

(21) Appl. No.: 11/012,367

(22) Filed: Dec. 14, 2004

(65) Prior Publication Data

US 2006/0130037 A1   Jun. 15, 2006

(51) Int. Cl.
G06F 9/44 (2006.01)
G06F 9/445 (2006.01)

(52) U.S. Cl. .................. 717/173; 717/169; 717/178

(58) Field of Classification Search ......... 717/168–178; 709/226

See application file for complete search history.

(56) References Cited

U.S. PATENT DOCUMENTS

| | | | |
|---|---|---|---|
| 5,701,427 A | 12/1997 | Lathrop | |
| 5,737,601 A | 4/1998 | Jain et al. | |
| 5,806,075 A | 9/1998 | Jain et al. | |
| 6,205,551 B1 | 3/2001 | Grosse | |
| 6,269,456 B1 | 7/2001 | Hodges et al. | |
| 6,493,871 B1 | 12/2002 | McGuire et al. | |
| 6,629,138 B1* | 9/2003 | Lambert et al. | 709/224 |
| 6,681,342 B2 | 1/2004 | Johnson et al. | |
| 6,754,664 B1 | 6/2004 | Bush | |
| 6,892,317 B1 | 5/2005 | Sampath et al. | |
| 7,130,921 B2* | 10/2006 | Goodman et al. | 709/244 |
| 7,287,068 B1* | 10/2007 | Eriksson et al. | 709/221 |
| 7,313,791 B1* | 12/2007 | Chen et al. | 717/170 |
| 2002/0049760 A1 | 4/2002 | Scott et al. | |
| 2002/0116151 A1 | 8/2002 | Brown et al. | |
| 2003/0028585 A1 | 2/2003 | Yeager et al. | |
| 2003/0115251 A1 | 6/2003 | Fredrickson et al. | |
| 2003/0233455 A1* | 12/2003 | Leber et al. | 709/226 |
| 2004/0068662 A1 | 4/2004 | Ho et al. | |
| 2004/0088564 A1 | 5/2004 | Norman | |
| 2004/0205419 A1 | 10/2004 | Liang et al. | |

(Continued)

FOREIGN PATENT DOCUMENTS

WO   WO 0184313 A2   11/2001

(Continued)

OTHER PUBLICATIONS

Cohen, Bram, "Incentives Build Robustness in BitTorrent." May 22, 2003.*

(Continued)

*Primary Examiner*—Wei Y Zhen
*Assistant Examiner*—Ryan D Coyer
(74) *Attorney, Agent, or Firm*—Wolf, Greenfield & Sacks, P.C.

(57) ABSTRACT

Embodiments of the present invention provide the ability for a software provider to distribute software updates to several different recipients utilizing a peer-to-peer environment. The invention described herein may be used to update any type of software, including, but not limited to, operating software, programming software, anti-virus software, database software, etc. The use of a peer-to-peer environment with added security provides the ability to minimize download time for each peer and also reduce the amount of egress bandwidth that must be provided by the software provider to enable recipients (peers) to obtain the update.

28 Claims, 10 Drawing Sheets

U.S. PATENT DOCUMENTS

| | | | |
|---|---|---|---|
| 2004/0250107 | A1 | 12/2004 | Guo |
| 2004/0261071 | A1* | 12/2004 | Chuang et al. ............... 717/170 |
| 2005/0015622 | A1 | 1/2005 | Williams et al. |
| 2005/0050378 | A1 | 3/2005 | Liang |
| 2005/0071838 | A1* | 3/2005 | Hatasaki .................... 717/168 |
| 2005/0076325 | A1* | 4/2005 | Bergin et al. ................ 717/100 |
| 2005/0086473 | A1 | 4/2005 | Barkley et al. |
| 2005/0086526 | A1 | 4/2005 | Aguirre |
| 2005/0132216 | A1 | 6/2005 | Franczek |
| 2005/0132382 | A1 | 6/2005 | McGuire et al. |
| 2005/0166198 | A1 | 7/2005 | Gigliotti et al. |
| 2007/0136297 | A1 | 6/2007 | Choe |

FOREIGN PATENT DOCUMENTS

| | | |
|---|---|---|
| WO | WO 02/065282 A2 | 8/2002 |

OTHER PUBLICATIONS

Raim, et al., "Large Scale Update Distribution with BitTorrent", Oct. 2004, Lehigh University Department of Computer Science.*

Castro, M., et al., "SplitStream: High-Bandwidth Content Distribution in Cooperative Environments," Microsoft Research, Cambridge, UK, and Rice University, Houston, Texas.

Cohen, B., "Incentives Build robustness in BitTorrent," bram@bitconjurer.org, May 2003.

M. Izal, et al., "Dissecting BitTorrent: Five Months in a Torrent's Lifetime," Institut Eurecum, Antipolis, France.

"BitTorrent: Protocol Specification," <http://www.bitconjurer.org/BitTorrent/protocol.html> [earliest known date Feb. 17, 2004; retrieved Dec. 8, 2004].

Sterritt, R., et al., "Personal autonomic computing self-healing tool," *Engineering of Computer-Based Systems, 2004. Proceedings. 11th International Conference and Workshop on the*, May 24-27, 2004, pp. 513-520. Abstract from.

http://ieeexplore.ieee.org/search/freesrchabstract.jsp?arnumber=1316741&isnumber=29178&punumber=9203&k2dockey=1316741@ieeecnfs&query=%28+%28+peer-to-peer++and+network+and+health+and+monitoring%3Cin%3Eti+%29+%3Cor%3E+%28+peer-to-peer++and+network+and+health+and+monitoring %3Cin%3Eab+%29+%29&pos=15 Retrieved Sep. 26, 2005.

Abielmona, R., et al., "Can an intelligent society of robots survive in a hostile environment?" *Electrical and Computer Engineering*, 2003. *IEEE CCECE 2003*, May 4-7, 2003, pp. 1235-1238 vol. 2. Abstract from http://ieeexplore.ieee.org/search/srchabstract.jsp?arnumber=1226122&isnumber=27521&punumber=8688&k2dockey=1226122@ieeecnfs&query=%28+%28+peer-to-peer++and+network+and+health+and+monitoring%3Cin%3Eti+%29+%3Cor%3E+%28+peer-to-peer++and+network+and+health+and+monitoring% 3Cin%3Eab+%29+%29&pos=23 Retrieved Sep. 26, 2005.

Harmer "An artificial immune system architecture for computer security applications," Abstract, available at: http://ieeexplore.ieee.org/search/srchabstract.jsp?arnumber=1011540&isnumber=21802&punumber=4235&k2dockey=1011540@ieeejrns&query=%28+%28+peer-to-peer++and+network+and+health+and+monitoring %3Cin%3Eti+%29+%3Cor%3E+%28+peer-to-peer++and+network+and+health+and+monitoring%3Cin%3Eab+%29+%29&pos=2, Published Jun. 2002. Retrieved Sep. 26, 2005.

International Search Report in PCT/US2005/047019, Date of mailing, May 1, 2007.

Datta et al., "Updates in Highly Unreliable, replicated Peer-to-Peer Systems," Proceedings of the 23$^{rd}$ International Conference on Distributed Computing Systems (ICDCS'03), 1063-6927/03, 2003 IEEE.

Gribble et al., "What can Databases Do for Peer-to-Peer?" WebDB Workshop on Databases and the Web, 2001.

* cited by examiner

METHOD AND SYSTEM FOR DOWNLOADING UPDATES

FIELD OF THE INVENTION

In general, the present invention relates to computer updates and, in particular, to a system and method for obtaining and installing updates utilizing a peer-to-peer network environment.

BACKGROUND OF THE INVENTION

Computers, and in particular, computer software, is often updated by a user downloading a software patch from a host, such as the software provider, via a network, such as the Internet. Currently, patches are downloaded in their entirety from a single source and installed on the downloading machine to update the software to a current state. While this technique is operational it has several drawbacks.

First, the software provider that makes the patch available for download must provide a sufficient amount of egress bandwidth to allow multiple customers to download updates at the same time. For software providers with a large number of customers, such egress bandwidth may become very expensive.

Second, a customer must download the entire patch from one source prior to installing the patch and updating the software. While this may be acceptable for small sized patches, for a larger patch, the time needed to download the entire patch from one source may be unacceptable. Third, if the software provided has not made ample bandwidth available for the downloads (particularly difficult and expensive when a high-priority patch, such as a security update, is released), a customer may be temporarily prohibited from downloading the patch.

Figure 1:
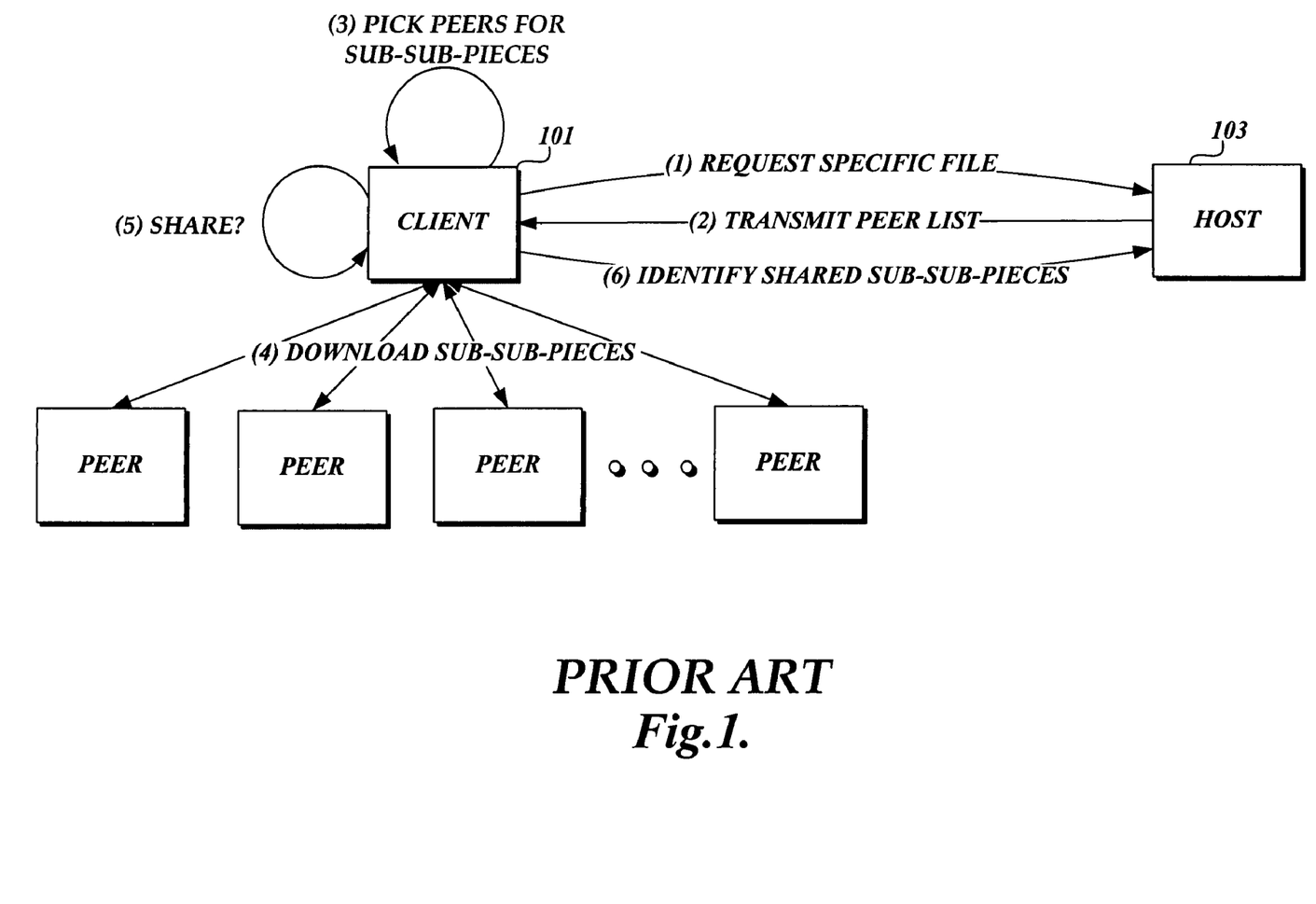
FIG. 1 illustrates a block diagram of a typical peer-to-peer environment for downloading a specific file.

Recent advances in peer-to-peer networking have provided the ability to download different parts of a large file from a plurality of peers. For example, FIG. 1 illustrates a block diagram of a typical peer-to-peer environment for downloading a specific file. To download a specific file, a client 101 requests the specific file from a host 103. In response, the host transmits a peer list identifying a plurality of peers that make available for download different pieces of these requested files. For example, a video file may be subdivided into a plurality of pieces, those pieces divided into sub-pieces, and those sub-pieces divided into sub-sub-pieces. Each peer that has previously downloaded the video file, either from one source or from multiple other peers, may make available for download by other peers, such as the client 101, one or more of these sub-sub-pieces of the entire file. The peer list transmitted by the host 103 to the client 101 identifies each of the sub-sub-pieces of the requested specific file and an associated peer that makes available for download those sub-sub-pieces.

The client 101, upon receipt of the peer list from the host 103, picks a peer for each of the sub-sub-pieces from which it will download that sub-sub-piece. Upon identification of peers, the client 101 downloads each of the sub-sub-pieces from the selected peers until all of the sub-sub-pieces of the specific file have been downloaded. By downloading pieces from different peers, multiple downloads may be conducted simultaneously. As each sub-sub-piece is downloaded, the client 101 may decide whether or not it wants to become a peer that makes available for download that sub-sub-piece (i.e., share that sub-sub-piece). If the client decides it does want to share that sub-sub-piece, the client 101 identifies to the host 103 the sub-sub-piece that it is willing to share.

While peer-to-peer environments, such as that described with respect to FIG. 1, provide the ability for a client to download a specific file that it requests, such as a video file, there is currently no technique for the determining what files a client may need. For example, referring back to downloading software patches, prior to requesting a patch, a client must know not only what updates are available, but what updates the client needs. Still further, there is currently no security feature to protect a downloading computer from being compromised by identifying what it is sharing prior to that material being fully integrated into the downloading computer. Furthermore, no method exists by which multiple patches in a client's local cache may be prioritized by the software provider when the client needs to reclaim local cache space.

Accordingly, there is a need for a system and method that allows a client to identify needed software updates and securely download those updates utilizing a peer-to-peer environment.

SUMMARY OF THE INVENTION

Embodiments of the present invention provide the ability for a software provider to distribute software updates to several different customers utilizing a peer-to-peer environment. The invention described herein may be used to update any type of software, including, but not limited to, operating software, programming software, anti-virus software, database software, etc. The use of a peer-to-peer environment with added security provides the ability to minimize download time for each peer and also reduce the amount of egress bandwidth that must be provided by the software provider to enable its customers (peers) to obtain the update.

In accordance with a first aspect of the present invention, a method for updating a first computing device is provided. The method receives a list of available updates, and determines if any of the updates on the list are needed. If any of the updates are needed, a computing device list is received that identifies pieces of the update and computing devices from which those pieces may be obtained. Those pieces are then downloaded from the computing devices, wherein at least two of the plurality of pieces are downloaded from different computing devices. Once the pieces have been downloaded, the software of the first computing device is updated utilizing the downloaded pieces.

In accordance with another aspect of the present invention, a method for providing a peer list to a client for downloading software updates is provided. The method transmits a list identifying an available update and receives a peer list request for the available update. In response, a peer list is generated identifying a plurality of peers, wherein each identified peer makes available for download at least a portion of the available update. That peer list is then transmitted.

In accordance with another aspect of the present invention, a computer system having a computer-readable medium including a computer-executable program therein for performing the method of obtaining an update is provided. The computer system receives a list of available updates and identifies a needed update from the list of available updates. A peer list is then requested and received for the needed update. The received peer list identifies a plurality of pieces of the needed update, and identifies for each piece, one or more computing devices which make that piece available for download. The computer system then downloads each of the pieces from the identified computing devices.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Embodiments of the present invention provide the ability for a software provider, referred to herein as a host, to distribute pieces of software updates to several different recipients (referred to herein as peers). A peer, as referred to herein, includes any type of computing device that makes available for download a portion (piece) of a software update. For example, a peer may be, but is not limited to, an individual computing device, a server, a host computing device, a client computing device, etc. Peers with pieces of a software update make that piece available to other peers for download. As additional peers obtain the same pieces of software, they too make those pieces available for download by other peers. Thus, as the number of peers containing a piece grows, the number of available download sites for that piece increases.

Figure 2A:
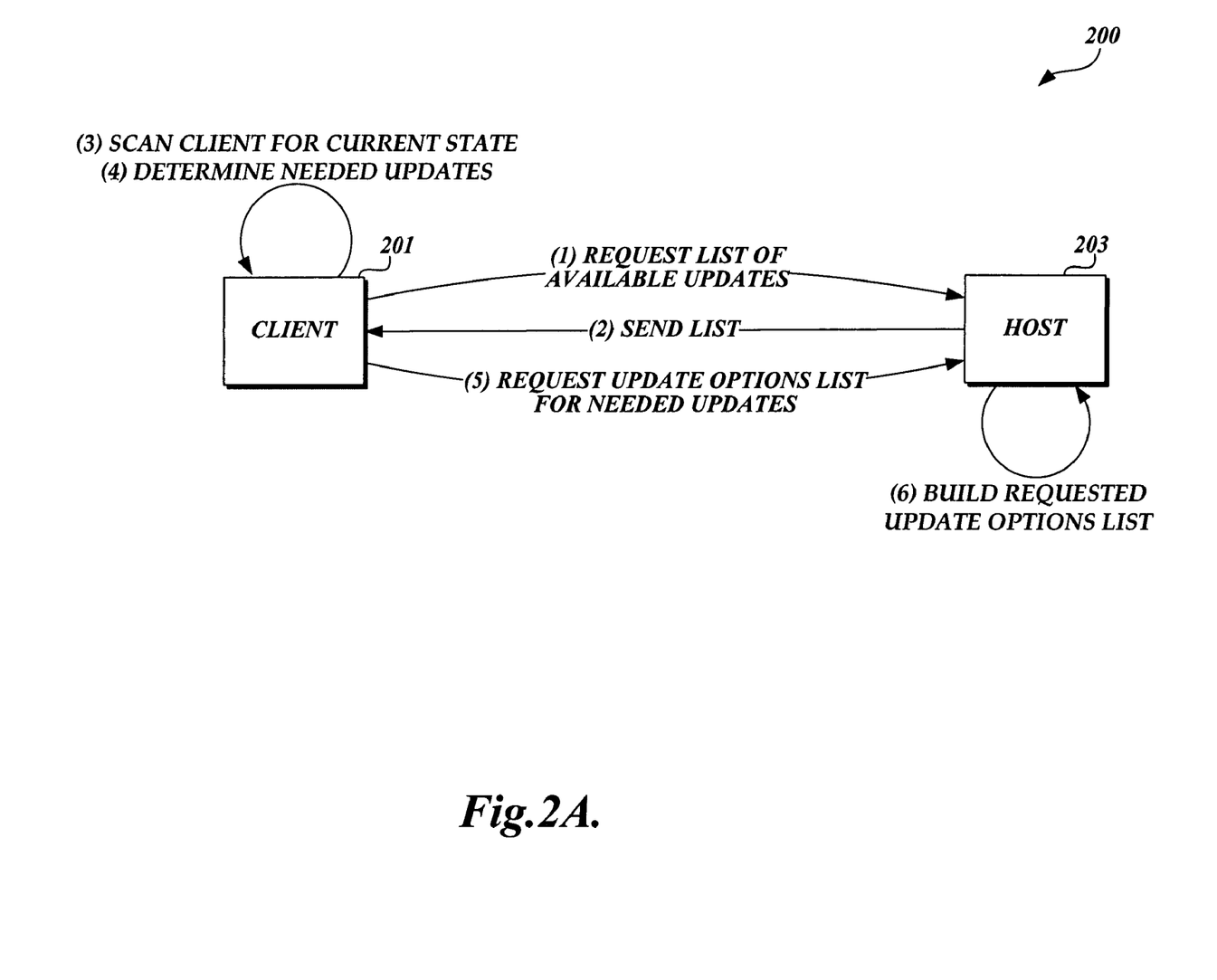
FIGS. 2A-2C illustrates a state diagram for downloading a software update utilizing a peer-to-peer environment, in accordance with an embodiment of the present invention.
Figure 2B:
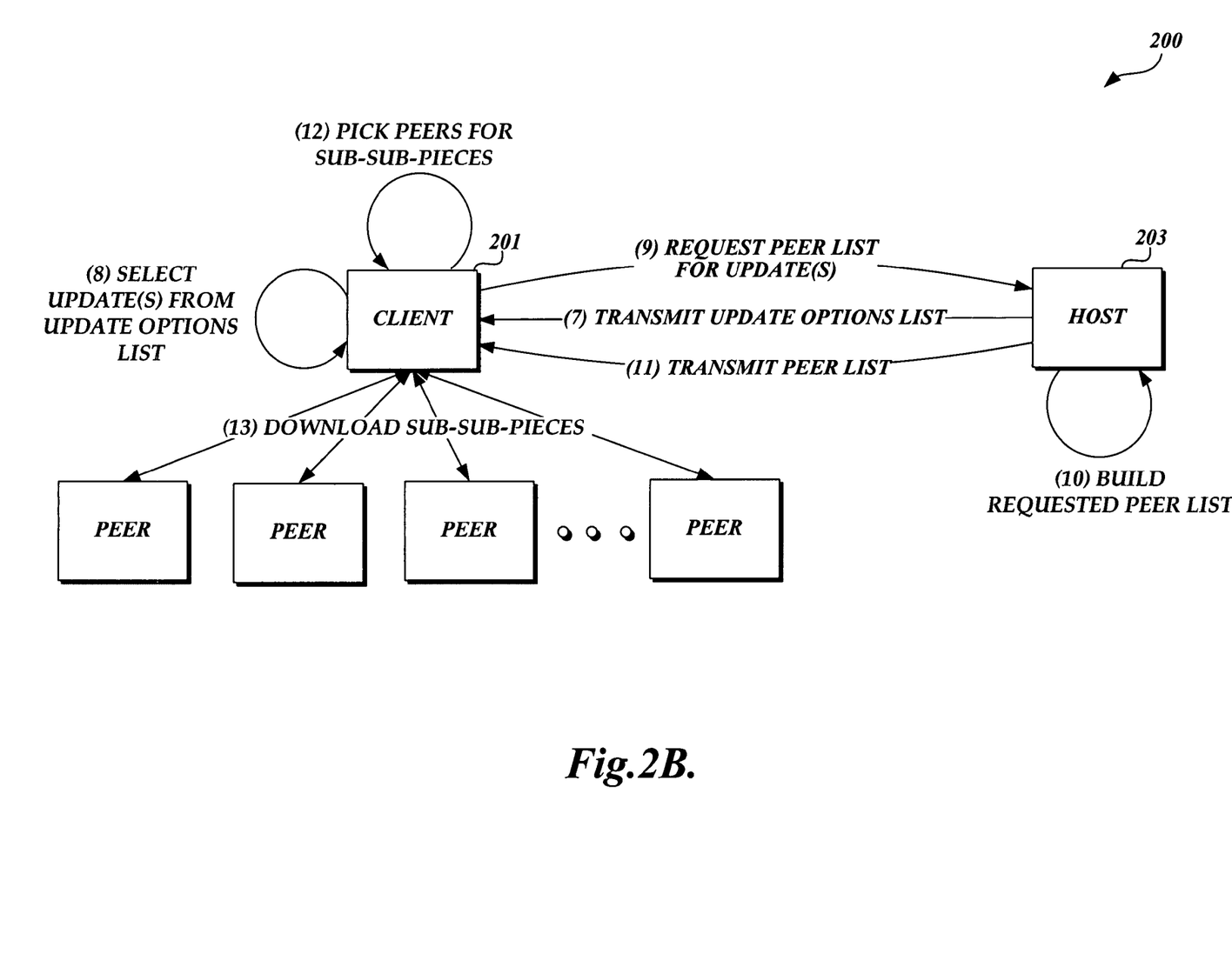
Figure 2C:
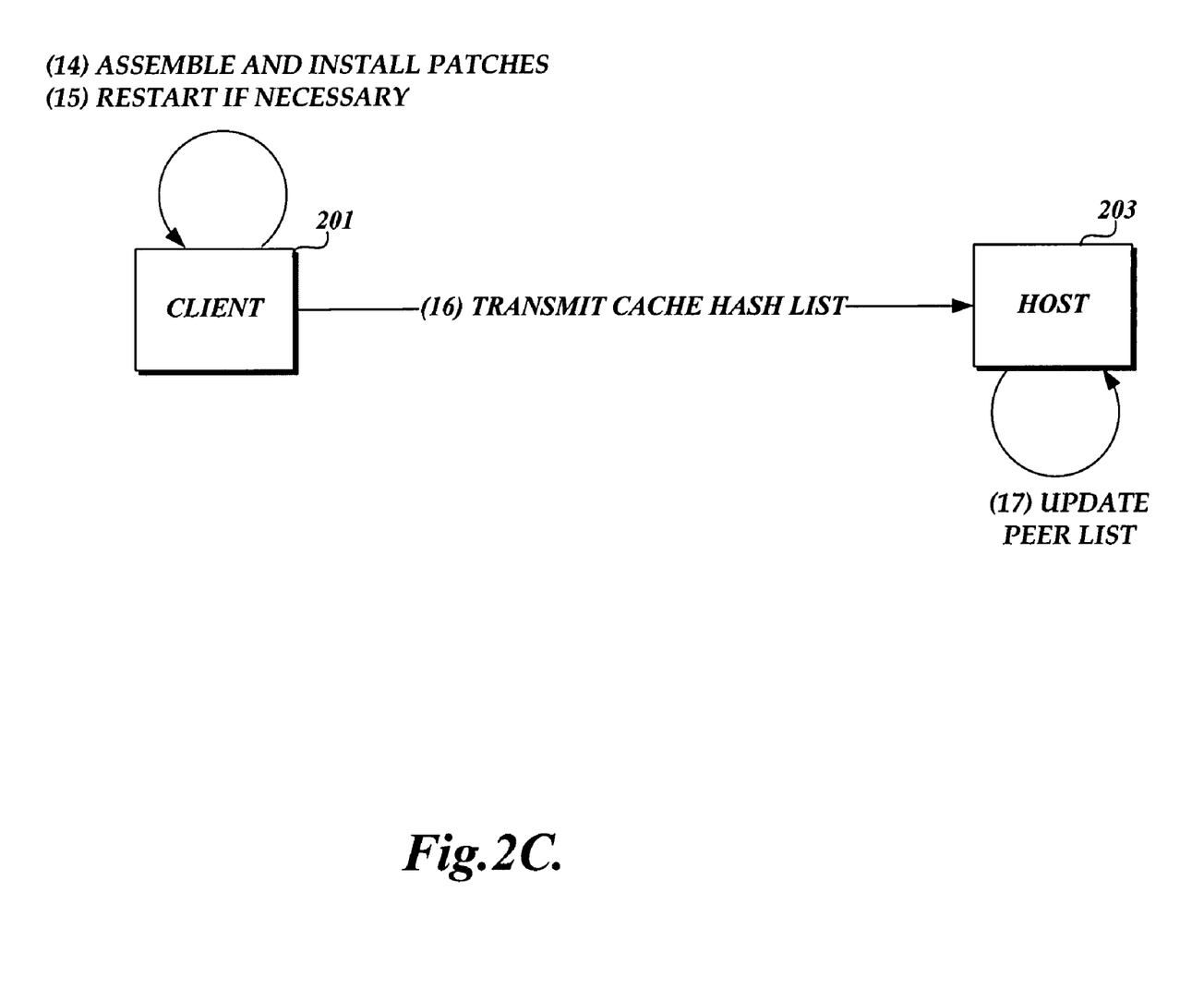

FIGS. 2A-2C illustrates a state diagram for downloading a software update utilizing a peer-to-peer environment, in accordance with an embodiment of the present invention. The peer-to-peer environment 200 provides the ability for a client 201 to identify needed updates and obtain a list of peers from a host 203 from which it may obtain portions of those updates.

Referring first to FIG. 2A, at an initial state, the client 201 requests from a host a list of updates that are available from the host 203. In an alternative embodiment, the host 203 may, at periodic times, publish an available update list that is obtained by a client 201. The host 203, upon receipt of a request for a list of available updates, sends the list of available updates to the client 201. The client 201 scans itself to determine its current state and compares that state with the list of available updates to determine what updates are needed. Upon a determination of needed updates, the client 201 requests a list of update options for the needed updates from the host 203. The host 203 upon receipt of a request for update options for needed updates builds an update options list.

For privacy concerns of a client, in an embodiment of the present invention, a minimal amount of client information is passed from the client to the host. For example, as just discussed, the host provides a list of available updates and the client decides which are needed. In an alternative embodiment, a client could provide a host with an identification of its current status, or information corresponding to various states of operation, and the host could inform the client of needed updates.

Figure 3:
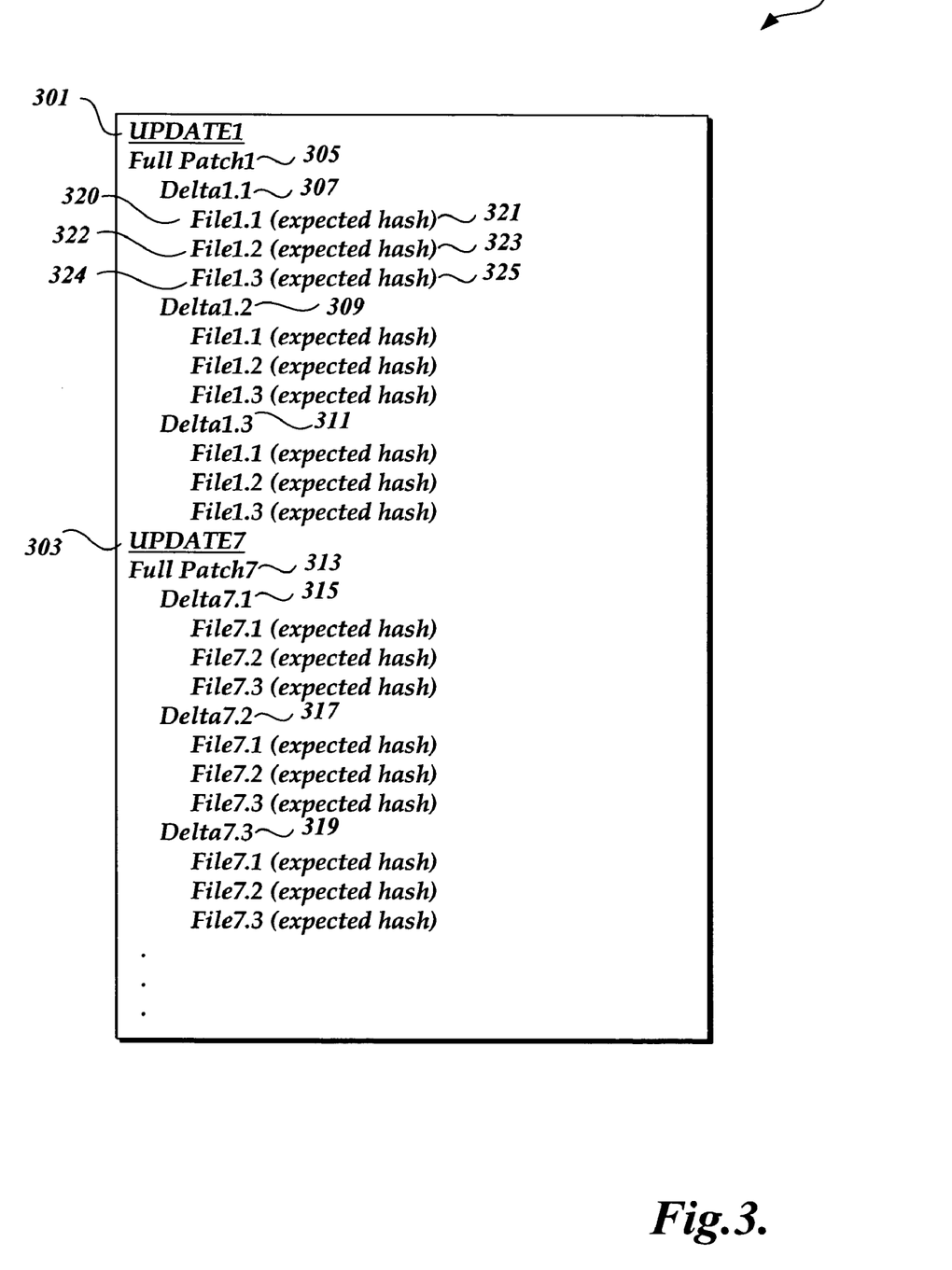
FIG. 3 is a block diagram of an update options list identifying different options for needed updates that may be generated by a host, in accordance with an embodiment of the present invention.

Referring to FIG. 3, an update options list identifying different options for needed updates that may be generated by a host, in accordance with an embodiment of the present invention, is described. The update options list 300 identifies, for each update requested by the client 201, such as UPDATE1 301, the different options available for obtaining that update. Additionally, the update options list 300 may include update options for several requested updates. For example, assuming the client 201 requested update options for UPDATE1 301 and UPDATE7 303, the update options list 300 would include an identification of each of the requested updates 301, 303 and an identification of the different options available for obtaining that update. For example, UPDATE1 301 may include an identification of a Full Patch1 305, a Delta1.1 patch 307, a Delta1.2 patch 309, and a Delta1.3 patch 311. Likewise, UPDATE7 303 may include an identification of a Full Patch7 313, a Delta7.1 patch 7.1 315, a Delta7.2 patch 317, and a Delta7.3 patch 319.

Full Patch1 305, is a full update that may be installed to bring the software from an existing state to a current state. Each delta patch may be used to bring the software from a known existing state to a current state without having to use the full patch. Software that is to be updated is often in one of several different known states that may be identified. Thus, for each of those known states a delta patch may be used to modify that software to bring it to a current state. For example, Delta1.1 patch 307 may be used to bring a version of software at a known existing state to a current state.

In order to allow the client 201 to determine if it can use one of the delta patches to update the software, each delta patch includes a list of files and an expected hash value for those files. The expected hash value may be used to determine if the delta patch is appropriate for the existing software. For example, Delta1.1 patch 307 includes a File1.1 320 with an expected hash value 321, a File1.2 322 with an expected hash value 323, and a File1.3 324 with an expected hash value 325. A client, upon receiving the update options list 300, may hash the current state of the files that are to be updated on the client's system 201 and determine if the hash values match the expected hash values contained in the update list. If the hash values match, then the corresponding delta patch may be used to update the client's system. Utilizing a delta patch, such as Delta1.1 307, instead of using a full patch, such as Full Patch1 305, results in a smaller download because it is a partial update instead of a full update.

Referring now to FIG. 2B, once the host 203 has generated the requested update options list, that update options list is transmitted to the client 201. The client 201, selects from the update options list the patch for each update that will bring the state of the client 201 to a current state. As discussed above, the client may select a full patch or an appropriate delta patch for the updates that are needed. As will be appreciated by one of skill in the relevant art, one or more needed updates may be selected from the update options list. Upon selection of each of the appropriate patches, the client 201 requests a peer list for the needed updates. The host 203, in response to receiving a request for a peer list for needed updates, builds the requested peer list and transmits that peer list to the client 201.

The host maintains a master peer list that identifies each peer that makes portions of an update available for download. If an update has never been downloaded from the host, an initial peer list may only identify the host as being an available peer. In such a situation, the client would be the first to download the update and would select the host as the peer and download the entire file from the host. As discussed below, once the client has downloaded an installed the update, it identifies to the host that it is making available for download (share) one or more of the portions of the update. Thus, the host would add that client to the master peer list for the portions of the update that the client will share. As additional clients download the update from the host, the peer, or both, and identify themselves as now making portions of the update available for download, the available number of peers grows.

Figure 4:
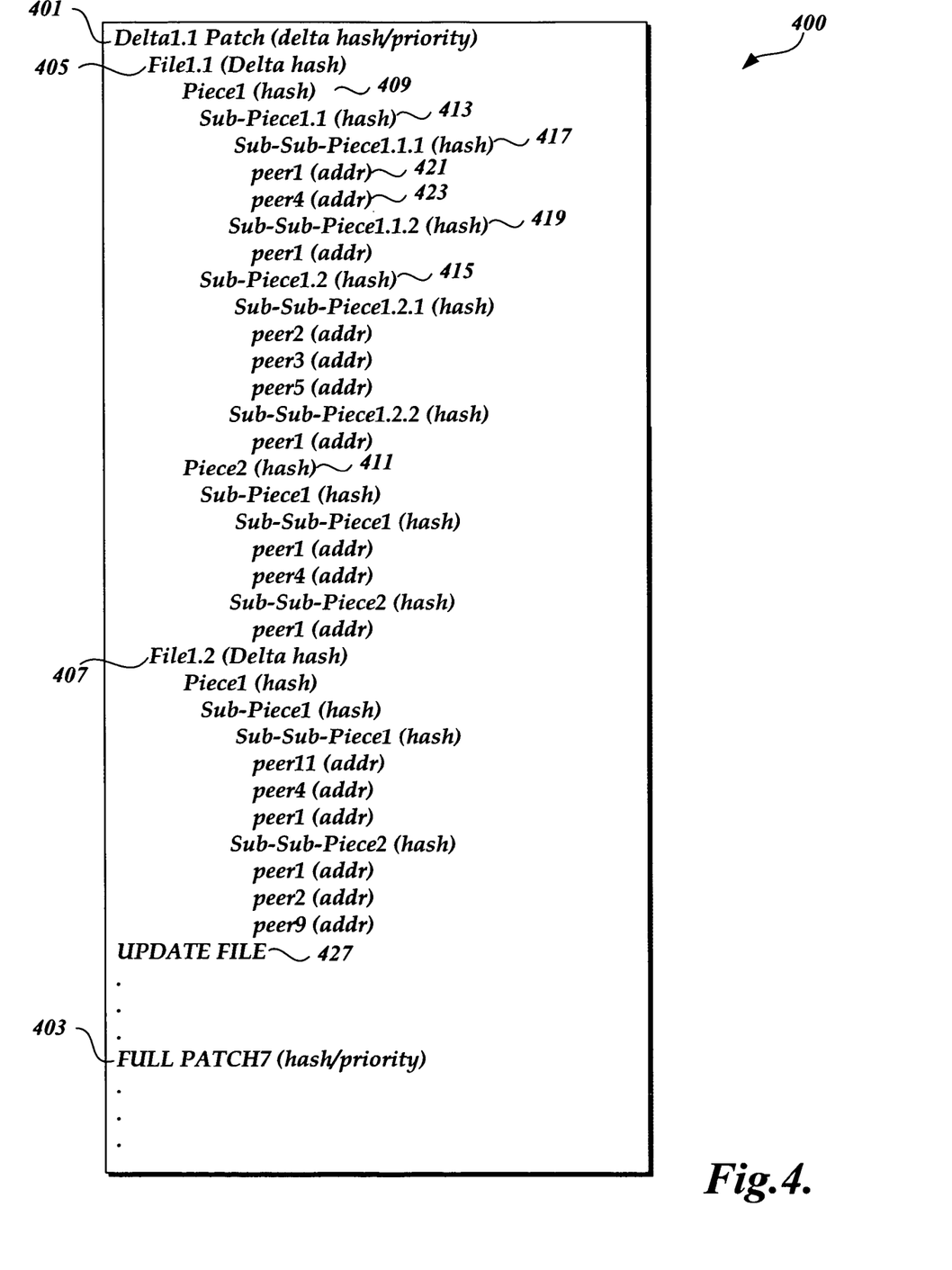
FIG. 4 illustrates a block diagram of a peer list identifying peers for a needed update in response to a request for a peer list from a client, in accordance with an embodiment of the present invention.

FIG. 4 illustrates a block diagram of a peer list identifying peers for a needed update in response to a request for a peer list from a client, in accordance with an embodiment of the present invention. Continuing with the above example, assuming a client 201 requested Delta1.1 patch 401, and Full Patch7 403, the peer list 400 would include details of each of those patches and identification of peers for those patches. Hash values are also included to verify the authenticity of downloaded patches.

For example, Delta1.1 patch 401 includes a delta hash and a priority value for that patch. As will be discussed in more detail below, the hash value for the patch may be used to confirm the validity of the hash prior to installation. In an alternative embodiment, the priority value may not be included in the patch. In such an embodiment, pieces are saved to the cache and as additional storage space becomes necessary, the client computer may request a priority list for the pieces that are currently located in the cache. This provides the ability for the host to dynamically control the priorities of pieces over time. Also as discussed below, the priority value of the patch may be used to determine whether pieces of a patch are to be maintained in a cache of the client computer or deleted. For each file of a patch, such as File1.1 405 and File1.2 407, a delta hash is also included. Like the delta hash of the patch, the delta hash for the file may be used to verify the authenticity of the file.

Additionally, each file, such as File1.1 405, may be divided into pieces, such as Piece1 409 and Piece2 411. Each piece of a file may further be divided into sub-pieces, and those sub-pieces divided into sub-sub-pieces. For example, Piece1 409 may be divided into sub-pieces, such as Sub-Piece1.1 413, and Sub-Piece1.2 415. Likewise, those sub-pieces may be further divided into sub-sub-pieces, such as Sub-Sub-Piece1.1.1 417 and Sub-Sub-Piece1.1.2 419. As will be appreciated by one of skill in the relevant art, division into pieces, sub-pieces, and sub-sub-pieces, may be taken to any level of division, and the granularity to sub-sub-piece, as described herein, if for explanation purposes only.

The smallest level of division, such as sub-sub-piece, includes an identification of one or more peers that make that piece available for download. For example, Sub-Sub-Piece1 417 includes an identification of two peers that make that piece available for download. In particular, Sub-Sub-Piece1.1.1 417 may be downloaded from Peer1 421 or Peer4 425. Each peer that makes a sub-sub-piece available for download is identified by an address, such as an Internet protocol address. The peer list 400 may include an identification of all peers that make a sub-sub-piece available for download, a portion of the peers that make a sub-sub-piece available for download, or one peer for each sub-sub-piece. Additionally, for each peer listed in the peer list, additional information may be provided. For example, additional information about a peer may include, but is not limited to, the bandwidth of the peer, the rating of the peer (how reliable the peer is), the peers affiliations with companies or organizations, the peers usage history of the peer-to-peer download system, etc. The peer list may also include an update command set 427, that provides instructions as to how to install the delta patch itself.

Referring back to FIG. 2B, the client 201, upon receipt of a peer list, selects peers for the sub-sub-pieces identified in the peer list. Peer and piece selection will be described in more detail below with respect to FIG. 6. Upon selection of sub-sub-pieces and peers from which those pieces are to be downloaded, the client 201 opens several channels of communications with the different peers and begins to download the different pieces of the updates simultaneously. The technique of downloading different pieces of an update from different peers increases the speed with which an update may be obtained and thereby decreases the overall download time. Additionally, providing updates via a peer-to-peer environment, reduces the egress bandwidth needed by the host 203. Utilizing embodiments of the present invention, as clients contact the host, download an update, and begin to share pieces of those updates with other clients (i.e., other peers), the egress bandwidth out of the host 203 reduces as clients are obtaining pieces of the update from other peers instead of the host. The technique handles extreme spikes in demand for specific content far more effectively than traditional file serving which can at best become very expensive and at worst fail entirely under the load.

Referring now to FIG. 2C, as download of each sub-sub-piece completes, that sub-sub-piece is hashed and compared with the hash value included in the peer list to confirm that the sub-sub-piece has not been altered. Once all of the sub-sub-pieces for a particular patch have been downloaded and authenticated, those pieces are assembled to recreate the patch. Additionally, a copy of one or more of the downloaded sub-sub-pieces is maintained in a cache. Those copies may be made available for download by other peers.

The assembled patch is installed to update the client to a current state. Upon completion of the installation, the client computer system may be restarted if necessary. Once the installation of the patches and restart of the client computer 201 (if needed) has completed, the client 201 transmits to the host 203 an identification of the sub-sub-pieces that are stored in the cache. Such an identification may be a hash value of each stored sub-sub-piece. The host 203, upon receipt of an identification of cached sub-sub-pieces, updates the master peer list adding the client as a peer that makes those pieces available for download. The master peer list includes a list of each peer that maintains a piece of a patch that is made available for download to other clients.

Figure 5:
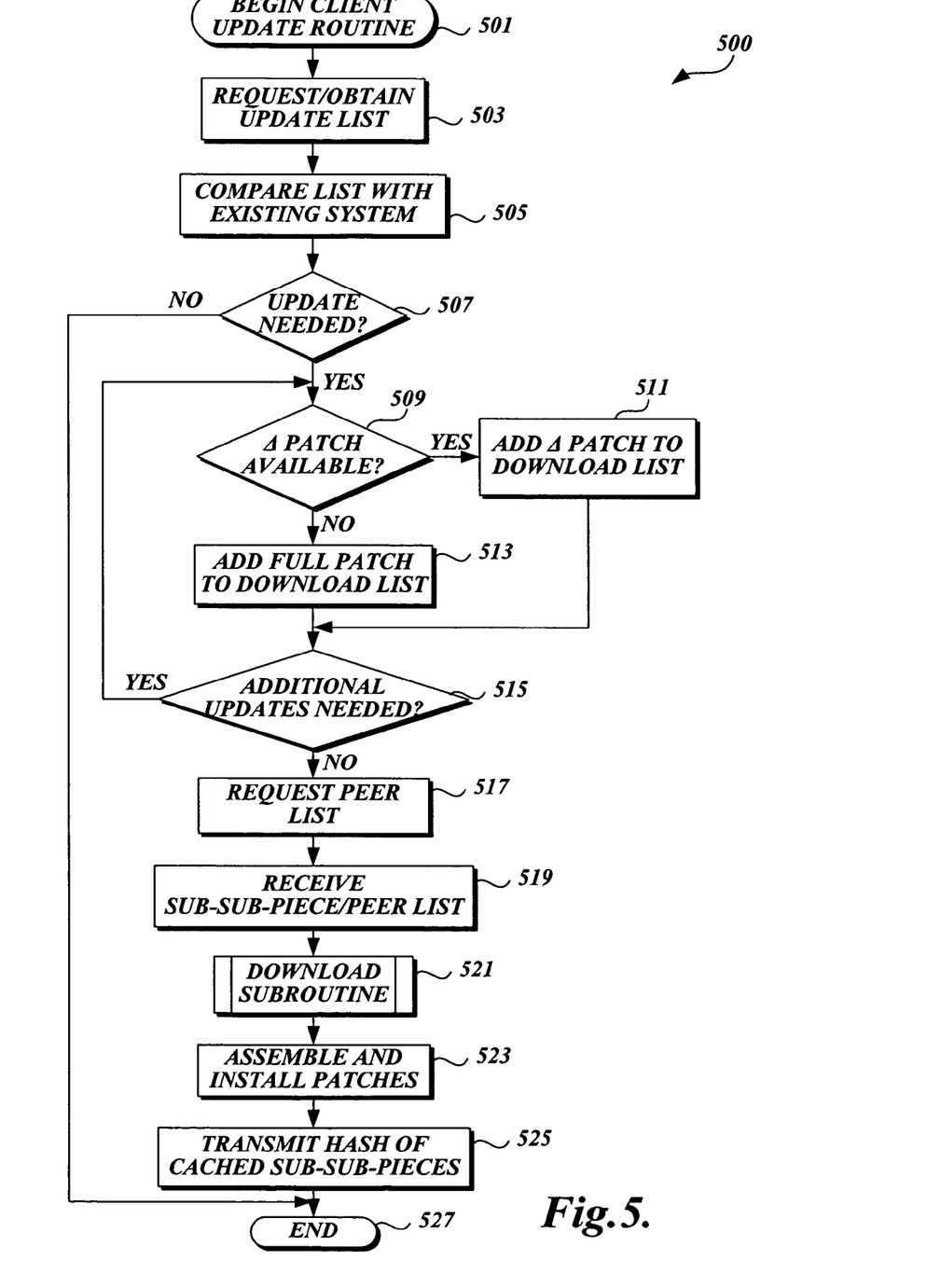
FIG. 5 is a flow diagram illustrative of a client software update routine for updating software of a client, in accordance with an embodiment of the present invention.

FIG. 5 is a flow diagram illustrative of a client software update routine for updating software of a client, in accordance with an embodiment of the present invention. The client software update routine 500 begins at block 501 and at block 503 the client requests and obtains an update list. As discussed above, the update list includes an identification of updates that are available for download. Utilizing that list, at block 505, a client compares the status of its existing system with the available updates. Based on that comparison, at decision block 507, a determination is made as to whether updates are needed to bring the client's existing system to a current state.

If it is determined at decision block 507 that updates are needed, at decision block 509, a determination is made as to whether a delta patch for the needed update is available. As discussed above, a determination of whether a delta patch is available for a needed update may be ascertained by requesting update options for a needed update and receiving a list of different update options. The list of different update options includes an identification of delta patches and expected hash values for files that will be updated by the delta patch. By comparing the expected hash values of the delta patch with the hash values of files on the client, a determination may be made by the client as to whether a delta patch is available. In an alternative embodiment, the list of available updates may also include update options for each available update, thereby removing the need to subsequently obtain update options.

Allowing a client to determine whether a delta patch is available, as opposed to the client providing hash values of its existing system to a host, allows the client to maintain privacy with respect to itself. If it is determined at decision block 509 that a delta patch is available, that delta patch is added to a download list, as illustrated by block 511. However, if it is determined at decision block 509 that a delta patch is not available, at block 513 an identification of a full patch for the update is added to the download list.

At decision block 515, a determination is made as to whether additional updates are needed to bring the client to a current state. If it is determined at decision block 515 that additional updates are needed, the client software update routine 500 returns to decision block 509 and the routine continues. However, if it is determined at decision block 515 that additional updates are not needed, at block 517 the client requests a peer list for the patches identified in the download list. In response to requesting a peer list at block 517, at block 519, the client receives a peer list that includes an identification of peers that make available for download each sub-sub-piece of each patch identified in the download list. Upon receipt of a peer list, the download subroutine, illustrated by block 521, is performed. The download subroutine will be described in more detail with respect to FIG. 6. Upon completion of the download subroutine, at block 523, the downloaded sub-sub-pieces are assembled to recreate the requested patches and those patches are installed on the client system to bring the client system to a current state.

Once the installation of the downloaded patches has completed and the client system restarted, if necessary, the client software update routine 500 transmits a hash of cached sub-sub-pieces, as illustrated by block 525. The cached sub-sub-pieces are those pieces that are stored in a cache of a client that the client will make available for download by other peers. In an embodiment of the present invention, a client is required to share pieces that it has downloaded from other peers to ensure that the peer-to-peer environment is maintained.

For example, if a client downloads 50 MB of updates via a peer-to-peer environment, the client may be required to make available for download the same amount of data that it itself has downloaded. In an actual embodiment of the present invention, the hash of cached sub-sub-pieces may not be transmitted, thereby identifying that sharing is available, until each of the pieces have been verified and installed. Verifying and installing patches prior to sharing those patches may be necessary because when a peer list is provided to other peers from a host, the address of a peer could be used with the knowledge of a peer's lack of a particular patch, such as one being downloaded, to compromise the peer machine. Once the hash of cached sub-sub-pieces has been transmitted at block 525, or if it is determined at decision block 507 that no updates are needed, the client software update routine 500 completes at block 527.

The client software update routine 500 may be initiated manually, or in the alternative, scheduled to run on a periodic basis to ensure that the client is maintained at a current state. For example, the client software update routine 500 may be scheduled to run in the evening or when the client computing device is not being used. Additionally, as an added security feature, the available update list, the update options list, and the peer list may each be digitally signed by the host such that they cannot be altered. Digitally signing documents is known in the art and will thus not be described in detail herein.

Figure 6:
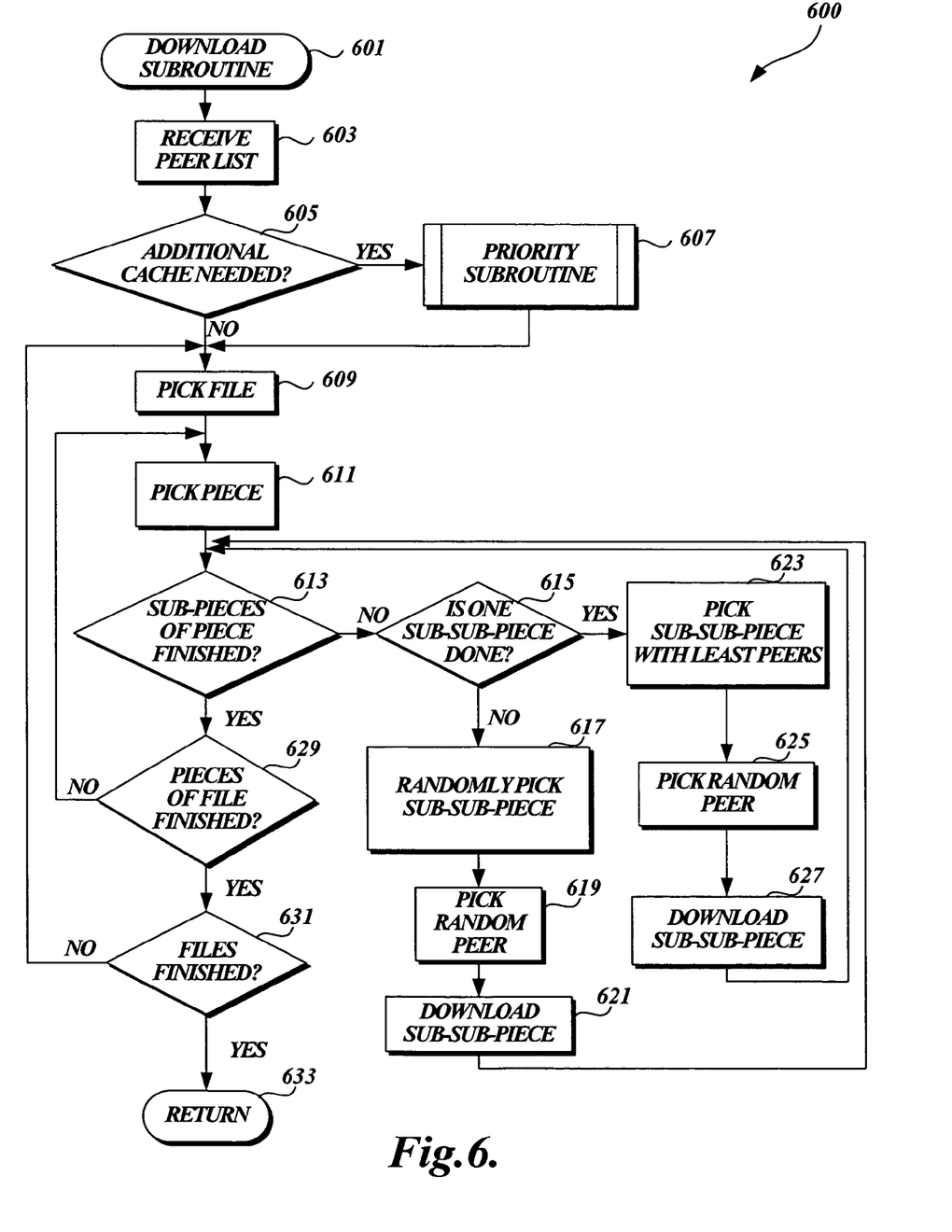
FIG. 6 illustrates a flow diagram of a download subroutine that may be executed as part of a client software update routine for downloading pieces of a needed update from different peers, in accordance with an embodiment of the present invention.

FIG. 6 illustrates a flow diagram of a download subroutine that may be executed as part of a client software update routine for downloading pieces of a patch from different peers, in accordance with an embodiment of the present invention. While the download subroutine 600 is described with respect to downloading one patch, it will be appreciated that any number of patches may be downloaded either simultaneously or at different times using the download subroutine 600.

The download subroutine 600 begins at block 601 and at block 603 a peer list for each of the sub-sub-pieces of one or more patches is received. As discussed above, the peer list identifies the addresses of peers that make available for download different sub-sub-pieces of a patch. During download of sub-sub-pieces, the peer list may be periodically updated (e.g., every two minutes) to ensure that the client is requesting downloads for available peers.

Utilizing that peer list, at decision block 605, a determination is made as to whether additional cache will be needed to store the sub-sub-pieces of the patch prior to installation. If it is determined at decision block 605 that additional cache will be needed, a priority subroutine is executed, as illustrated by block 607. The priority subroutine for obtaining additional cache will be described in more detail with respect to FIG. 7. However, if it is determined at decision block 605 that additional cache is not needed, at block 609 a file of the patch that is being downloaded is selected. At block 611, a piece of the selected file is chosen for which download is to begin. Utilizing this selected piece, at decision block 613 a determination is made as to whether one of the sub-pieces of that piece has finished downloading. If it is determined that one of the sub-pieces of that piece has not finished downloading, at decision block 615 a determination is made as to whether one of the sub-sub-pieces of that sub-piece has been downloaded. If it is determined at decision block 615 that one of the sub-sub-pieces of a sub-piece has not been downloaded, at block 617, a sub-sub-piece of a sub-piece is randomly selected. At block 619, a peer that makes available for download the randomly selected sub-sub-piece is also randomly selected. Upon selection of a sub-sub-piece and a peer, at block 621, download of the sub-sub-piece from the selected peer begins. Once download of the sub-sub-Piece has begun, the download subroutine 600 returns to block 613 and continues.

Referring back to decision block 615, if is determined that one of the sub-sub-pieces has completed downloading, at block 623 a sub-sub-piece of a sub-piece that has a least amount of peers for which that sub-piece is available for download is selected. Additionally, at block 625, one of the peers for the selected sub-sub-piece is randomly chosen. At block 627, download of the selected sub-sub-piece from the randomly chosen peer is initiated. Once the download of the selected sub-sub-piece has begun, at block 627, the download subroutine 600 returns to block 613 and continues.

Because multiple sub-sub-pieces may be downloaded at the same time, thereby decreasing the total time necessary to download a patch, or multiple patches, once download has begun at block 621 or block 627, the download subroutine 600 continues by choosing another piece and another peer and initiating that download. Thus, a total saturation of bandwidth for a client that is downloading an update may be accomplished and download of an update may be completed quickly. Additionally, as download of each sub-sub-piece completes, the authenticity of those pieces may be verified by hashing the sub-sub-piece and comparing that hash value with the hash value included in the peer list.

Returning now to decision block 613, if it is determined that a sub-piece of a piece has finished downloading, at decision block 629 a determination is made as to whether all pieces of a file have finished downloading. If it is determined at decision block 629 that all pieces of a file have not finished downloading, the download subroutine 600 returns to block 611 and picks another piece and the process continues. However, if it is determined at decision block 629 that all pieces of a file have finished downloading, at decision block 631, a determination is made as to whether all files for the patch have finished downloading. If it is determined at decision block 631 that all files for the patch have not finished downloading, the download subroutine 600 returns to block 609 and another file that is to be downloaded is selected. However, if it is determined at decision block 631 that all files of the patch have been downloaded and thus, all pieces, sub-pieces and sub-sub-pieces of the patch have also been downloaded, the routine completes at block 633 and returns control to the client software update routine 500 (FIG. 5).

Figure 7:
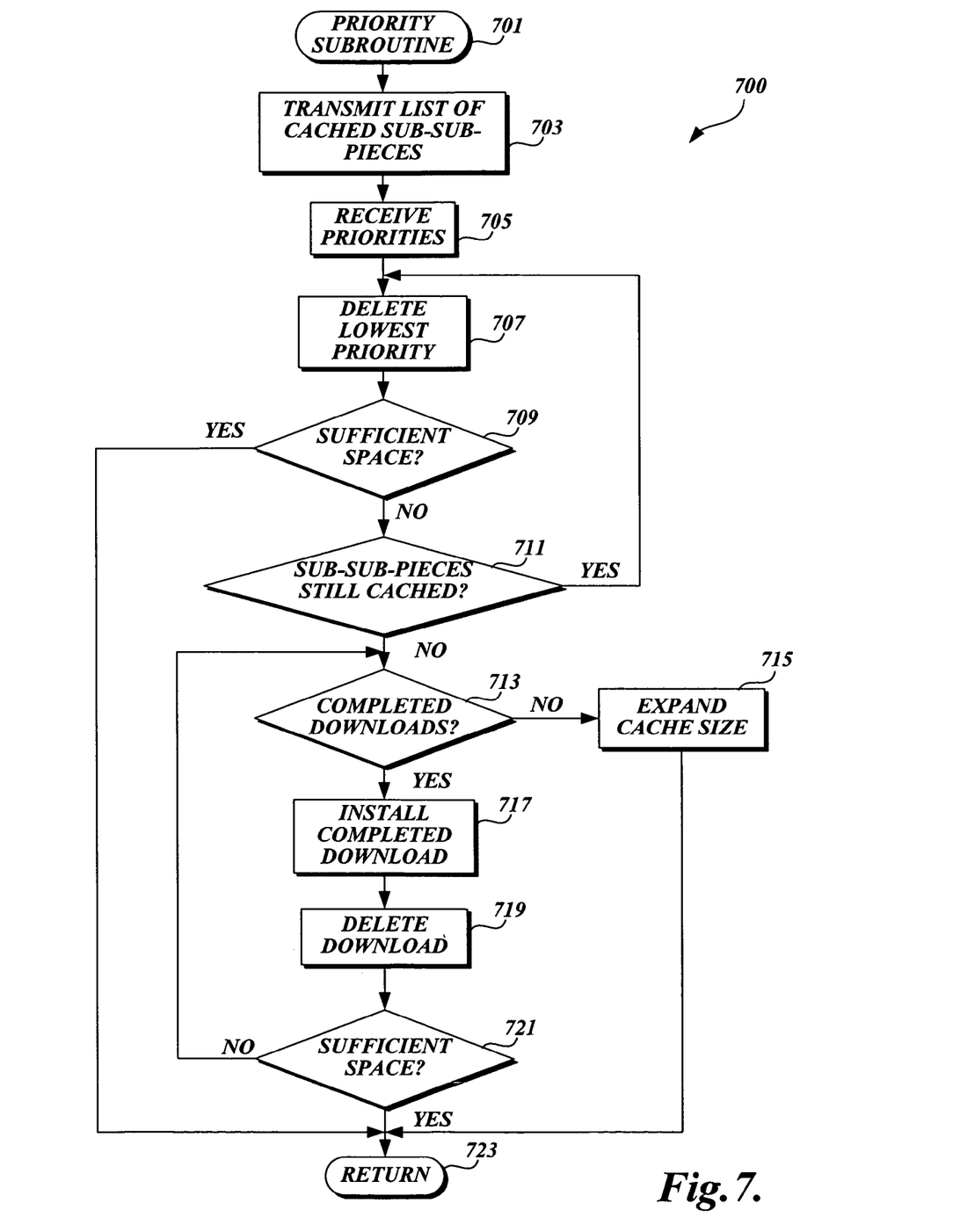
FIG. 7 illustrates a flow diagram of a priority subroutine for expanding cache size on a client system to enable a download of a patch, in accordance with an embodiment of the present invention.

FIG. 7 illustrates a flow diagram of a priority subroutine for expanding cache size on a client system to enable a download of a patch, in accordance with an embodiment of the present invention. A priority subroutine 700 begins at block 701 and at block 703 a list of all currently cached sub-sub-pieces that are shared is transmitted to a host. In response to transmission of a list of cached sub-sub-pieces that are shared, at block 705, priorities for each of those sub-sub-pieces is received. Sub-sub-pieces may be assigned priorities based on the frequency with which they are being requested for download. For example, if a new update has been published to provide a defense against a new computer virus, the patches, and thus, the sub-sub-pieces, for that update may be downloaded at a very high frequency. Thus, sub-sub-pieces of that update may receive a high priority.

Upon receipt of priorities for cached sub-sub-pieces, at block 707, a cached sub-sub-piece with a lowest priority is deleted from the cache. At decision block 709, a determination is made as to whether sufficient space is available in the cache for the update once a shared sub-sub-piece has been deleted. If is determined at decision block 709 that sufficient space is available, the routine returns control to the download subroutine 600 (FIG. 6), as illustrated by block 723. However, if it is determined at decision block 709 that sufficient space is still not available, at decision block 711, a determination is made as to whether there are other shared cached sub-sub-pieces that have not yet been deleted.

If it is determined at decision block 711 that there still remains cached sub-sub-pieces that are shared, the priority subroutine 700 returns to block 707 and deletes the next lowest priority and the process continues. In an actual embodiment of the present invention, some cached sub-sub-pieces associated with patches for particular updates may be identified as not deletable. For example, if the sub-sub-piece is associated with an update that is downloaded extremely frequently, it may be identified as not deletable to ensure that there are sufficient peers from which the sub-sub-piece may be downloaded.

If it is determined at decision block 711 that there are no cached sub-sub-pieces remaining that may be deleted, at decision block 713 a determination is made as to whether any patch has been completely downloaded. As discussed above, multiple patches may be downloaded simultaneously, in accordance with an embodiment of the present invention. If one of those patches has completed download, at decision block 713, it is identified and at block 717 that patch is installed. Such an installation may result in the remainder of the downloads being paused while that update is being installed. However, existing technology allows that paused downloads be resumed without having to restart. Thus, there is no substantial loss of downloaded data resulting from a pause/restart of a download. Once the downloaded patch has been installed, at block 717, the sub-sub-pieces of that patch are deleted from the cache, as illustrated by block 719, unless there are identified as not deletable. Upon deletion of the downloads, at decision block 721, a determination is made as to whether there is sufficient space in the cache for downloading the update. If it is determined at decision block 721 that there is not sufficient space in the cache, the priority subroutine 700 returns to decision block 713 and determines if there are other patches that have completed download, and the process continues.

Returning back to decision block 713, if it is determined that there are no patches that have completed downloading, at block 715 the cache size is expanded. A cache size may be expanded by requesting that a user of the client system expand the cache size. Alternatively, the cache size may be automatically expanded. Once sufficient space in the cache has been prepared for downloading updates, by either deleting existing pieces from the cache or expanding the cache size, the priority subroutine 700 completes at block 723, returning control to the download subroutine 600.

Figure 8:
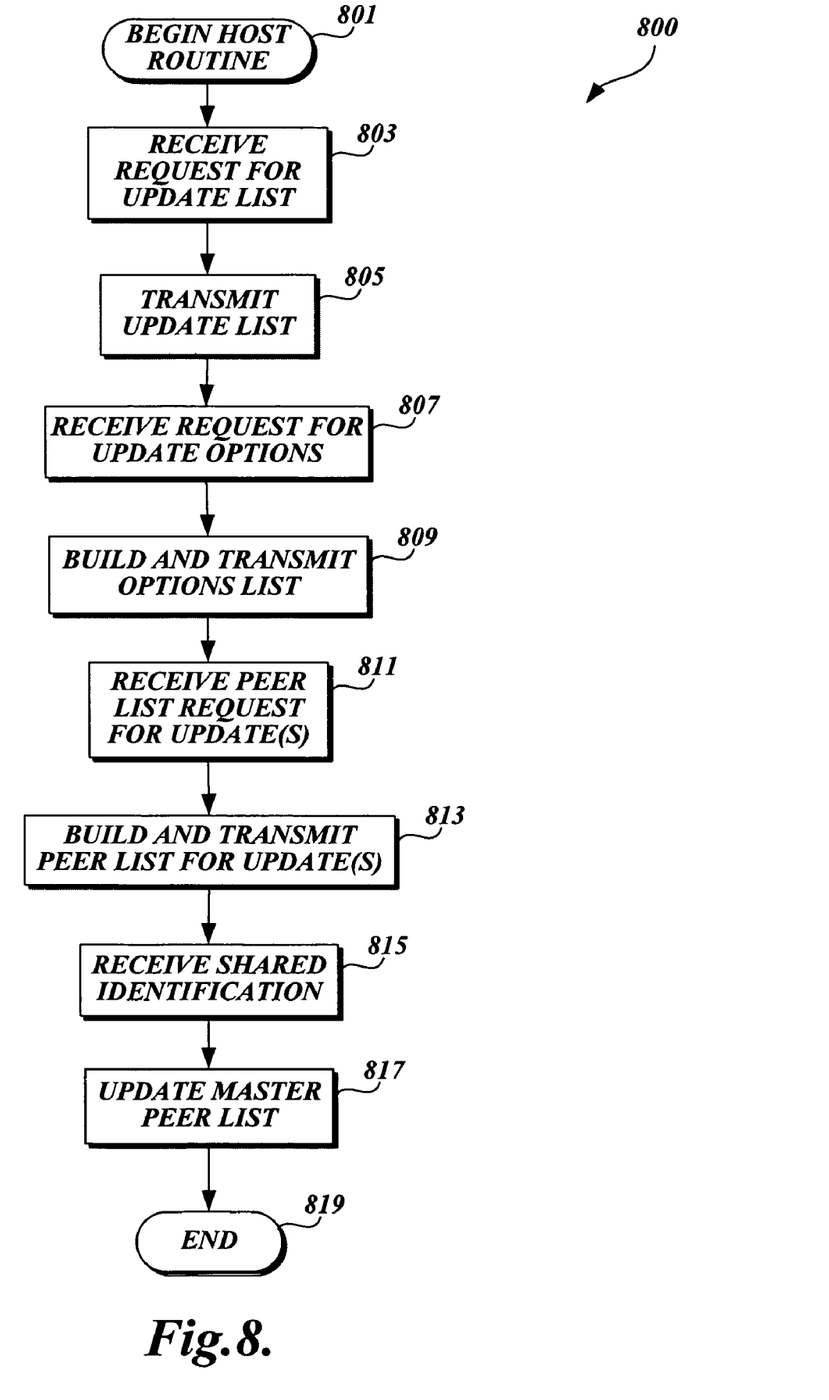
FIG. 8 illustrates a host routine for making available updates utilizing a peer-to-peer environment, in accordance with an embodiment of the present invention.

FIG. 8 illustrates a host routine for making available updates utilizing a peer-to-peer environment, in accordance with an embodiment of the present invention. The host routine 800 begins at block 801 and at block 803 the host receives a request for an update list. As discussed above, the update list is a list of available updates that are provided by that host for download. At block 805, the host transmits the update list identifying available downloads.

Once the update list has been transmitted, at some later point in time, a request for update options for one or more of the available updates identified on the update list is received from a client, as illustrated by block 807. At block 809, an update options list is generated for the updates identified in the request received at block 807. As discussed above, the update options list includes an identification of patches that may be used to obtain the update. That list is then transmitted to the client that requested the update options. At block 811, a peer list request is received requesting a peer list for one or more of the patches identified in the options list transmitted at block 809. The host, at block 813, generates and transmits a peer list for the requested patches. As discussed above, the peer list identifies, for each patch, the pieces, sub-pieces, and sub-sub-pieces. Additionally, for each of those sub-sub-pieces, one or more peers and the address of those peers are included to identify from where those sub-sub-pieces may be obtained. The peer list is then transmitted to the client, and at block 815, an identification of the sub-sub-pieces that have been downloaded and stored by that client that are now available for sharing with other peers is received. The received list is used to update a master peer list 817 that includes an identification of all sub-sub-pieces for available updates and the peers that have those sub-sub-pieces available for download. The host routine 800 completes at block 819.

While embodiments of the invention have been illustrated and described, it will be appreciated that various changes can be made therein without departing from the spirit and scope of the invention.

The embodiments of the invention in which an exclusive property or privilege is claimed are defined as follows:

1. A method for updating a first computing device in a network comprising the first computing device and a host, the first computing device having a cache for storing at least one update, the method comprising:
   (A) receiving at the first computing device, from the host, a list of update options for obtaining an available update, the list comprising information identifying a partial update, a full update, and an expected hash value of a component updatable by way of the partial update;
   (B) determining at the first computing device, in response to (A), an update option from the list of available update options, wherein (B) comprises:
      determining whether the first computing device comprises a component for which a hash value matches the expected hash value,
      when the first computing device comprises the component for which a hash value matches the expected hash value, selecting the partial update as the update option, and
      when the first computing device does not comprise the component for which a hash value matches the expected hash value, selecting the full update as the update option, wherein the selected update option is segmented into a plurality of pieces;
   (C) receiving at the first computing device, from the host, a list of computing devices in the network, wherein the list of computing devices identifies, for each piece of the plurality of pieces, at least one computing device that makes that piece available for download;
   (D) downloading to the first computing device, each of the plurality of pieces from the at least one computing device on the list of computing devices, wherein at least two of the plurality of pieces are downloaded from different computing devices; and—
   (E) updating the software of the first computing device utilizing the downloaded plurality of pieces, wherein (E) includes:
      assembling the downloaded pieces into a patch, and installing the patch,
   wherein each downloaded piece is confirmed based on a hash of the piece prior to the assembling of the downloaded pieces into the patch.

2. The method of claim 1, wherein the full update comprises a full patch, and the partial update comprises at least one delta patch.

3. The method of claim 2, wherein the delta patch includes a filename of a file to be updated using the delta patch and the expected hash value associated with the partial update comprises an expected hash value for the file.

4. The method of claim 1, further comprising:
   determining, at the first computing device, in response to (A), a needed update for which the update option is selected, wherein the determining includes scanning the first computing device to determine its current state, and comparing the current state with the available update, and
   removing, by the first computing device, a component in the cache if a determination is made to generate available space in the cache, the removing comprises:
      generating a priority list for updates stored in the cache by assigning a priority to each update stored in the cache;
      determining if the cache has the available space to download the plurality of pieces; and
      if the cache does not have the available space, selecting a component in the cache for removal, the component corresponding to an update having a low priority in the priority list, wherein the assigned priority for each update is based on a frequency of requests for each update.

5. The method of claim 1, wherein the list of computing devices includes, for at least one of the plurality of pieces, an identification of a plurality of computing devices.

6. The method of claim 1, wherein the computing devices are identified by an Internet protocol address.

7. The method of claim 1, further comprising:
   providing an identification of the downloaded plurality of pieces; and
   sharing the identified downloaded plurality of pieces with other computing devices.

8. The method of claim 7, wherein upon a predetermined point, the identified downloaded plurality of pieces are not shared.

9. A method for providing a peer list to a client for downloading software updates in a network comprising the client and a host, the method comprising:
   transmitting by the host, to the client, a list identifying options for an available update, the list comprising information identifying a partial update, a full update, and an indicator of an expected state of a component that is updatable by way of the partial update, the indicator indicating to a client whether a component of the client having a state matching the expected state is updatable by way of the partial update, such that the client receives information to make a selection between at least the partial update and the full update based at least in part on the indicator;
   receiving at the host, from the client, a request for a peer list corresponding to an update option in the list, the peer list identifying peers from which to request the update option from the list;
   generating by the host, the peer list identifying a plurality of peers and a plurality of pieces, the plurality of pieces collectively defining the requested update option; and
   transmitting by the host, to the client, the peer list, wherein the peer list identifies at least one peer for each of the plurality of pieces.

10. The method of claim 9, wherein the list identifying options for the available update identifies a plurality of available update options.

11. The method of claim 9, wherein the full update comprises a full patch, and the partial update comprises at least one delta patch.

12. The method of claim 9, wherein receiving at the host, from the client, a request for the peer list includes receiving a peer list request for one of the plurality of update options.

13. The method of claim 9, further comprising:
   receiving an identification of a cached piece of the available update; and
   updating a master peer list for the available update.

14. The method of claim 9, wherein one of the identified peers is a host computer.

15. A computer system having a computer-readable medium including a computer-executable program therein for performing a method of obtaining an update in a network comprising the computer system and a host, the method comprising:
- (A) receiving at the computer system, from the host, a list of update options for obtaining an available update, the list comprising information identifying a partial update, a full update, and an indicator of an expected state of a component that is updatable by way of the partial update;
- (B) identifying at the computer system, an update option from the list of update options, wherein (B) comprises:
    - determining whether the computer system comprises a component that is in the expected state indicated by the indicator and is updatable by way of the partial update,
    - when the computer system comprises a component in the expected state, selecting the partial update the update option, and
    - when the computer system does not comprise a component in the expected state, selecting the full update as the update option;
- (C) requesting by the computer system, from the host, a peer list for the selected update option;
- (D) receiving at the computer system, from the host, a peer list for the selected update option, wherein the peer list identifies a plurality of pieces of the selected update option, and identifies for each piece, a computing device in the network that makes that piece available for download; and
- (E) downloading to the computer system, each of the pieces from the identified computing devices.

16. The computer system of claim 15, wherein the peer list identifies for each of the plurality of pieces, a plurality of sub-pieces, and identifies for each sub-piece, a computing device that makes that sub-piece available for download.

17. The computer system of claim 16, wherein the peer list identifies for each of the plurality of sub-pieces, a plurality of sub-sub-pieces, and identifies for each sub-sub-piece, a computing device that makes that sub-sub-piece available for download.

18. The computer system of claim 15, further comprising a cache for storing the update, wherein the method further comprises removing, by the computer system, a component in the cache if a determination is made to generate available space in the cache, the removing comprises:
- generating a priority list for updates stored in the cache by assigning a priority to each update stored in the cache;
- determining if the cache has the available space to download the plurality of pieces; and
- if the cache does not have the available space, selecting the component for removal, the component corresponding to an update having a low priority in the priority list, wherein the assigned priority for each update is based on a frequency of requests for each update.

19. The computer system of claim 15, further comprising: installing the available update.

20. The computer system of claim 19, wherein the peer list includes a first hash value for the available update, and wherein the method further includes:
- hashing the assembled pieces to obtain a second hash value; and
- comparing the first hash value and the second hash value to confirm a validity of the update.

21. The computer system of claim 15, further comprising:
- storing at least one of the downloaded pieces in the cache;
- transmitting an identification of the cached piece; and
- making the cached piece available for download.

22. The computer system of claim 15, wherein downloading to the computer system, each of the pieces from the identified computing devices includes: confirming an authenticity of a downloaded piece.

23. The computer system of claim 15, wherein downloading to the computer system, each of the pieces includes:
- randomly picking a piece to download; and
- randomly picking a computing device from which to download the piece.

24. The computer system of claim 15, wherein downloading to the computer system, each of the pieces includes:
- identifying a piece with a least number of a computing device that make that piece available for download; and
- downloading the piece with the least number of the computing devices that make that piece available for download.

25. The method of claim 9, wherein the indicator of the expected state of the component that is updatable by way of the partial update comprises an expected hash value of the component that is updatable by way of the partial update.

26. The method of claim 25, wherein the peer list requested from the client comprises:
- the partial update as the update option when the client comprises a component for which a hash value matches the expected hash value; and
- the fill update as the update option when the client does not comprise a component for which a hash value matches the expected hash value.

27. The computer system of claim 15, wherein the indicator of the expected state of the component that is updatable by way of the partial update comprises an expected hash value of the component that is updatable by way of the partial update.

28. The computer system of claim 27, wherein determining whether the computer system comprises a component in the state updatable by way of the partial update comprises determining whether a hash value of the component of the computer system matches the expected hash value.

* * * * *

UNITED STATES PATENT AND TRADEMARK OFFICE
CERTIFICATE OF CORRECTION

| | | |
|---|---|---|
| PATENT NO. | : 7,716,660 B2 | Page 1 of 1 |
| APPLICATION NO. | : 11/012367 | |
| DATED | : May 11, 2010 | |
| INVENTOR(S) | : Jason F. Mackay | |

It is certified that error appears in the above-identified patent and that said Letters Patent is hereby corrected as shown below:

In column 11, line 44, in Claim 1, after "and" delete "-".

Signed and Sealed this
First Day of February, 2011

David J. Kappos
*Director of the United States Patent and Trademark Office*